(12) United States Patent
Chen

(10) Patent No.: US 8,908,105 B2
(45) Date of Patent: Dec. 9, 2014

(54) WIRELESS DISPLAY SYSTEM, WIRELESS DISPLAY DEVICE AND METHOD FOR SWITCHING WORKING MODE

(71) Applicant: Wistron Corporation, New Taipei (TW)

(72) Inventor: Feng-Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/180,318

(22) Filed: Feb. 13, 2014

(65) Prior Publication Data

US 2014/0320750 A1    Oct. 30, 2014

(30) Foreign Application Priority Data

Apr. 26, 2013  (TW) .............................. 102115087 A

(51) Int. Cl.
*H04N 5/63*   (2006.01)
*G06F 1/00*   (2006.01)
*H04W 4/00*   (2009.01)
*H04N 21/443*   (2011.01)

(52) U.S. Cl.
CPC ................................ *H04N 21/4436* (2013.01)
USPC ............ 348/730; 713/300; 713/324; 370/338

(58) Field of Classification Search
None
See application file for complete search history.

(56) References Cited

U.S. PATENT DOCUMENTS

| | | | |
|---|---|---|---|
| 6,877,099 B2 | 4/2005 | Sameshima et al. | |
| 2003/0037265 A1* | 2/2003 | Sameshima et al. | .......... 713/300 |
| 2006/0112287 A1* | 5/2006 | Paljug | ............................ 713/300 |
| 2009/0180451 A1* | 7/2009 | Alpert et al. | .................. 370/338 |
| 2010/0008341 A1* | 1/2010 | Ulupinar et al. | ............... 370/338 |

* cited by examiner

*Primary Examiner* — Jefferey Harold
*Assistant Examiner* — Sean Haiem
(74) *Attorney, Agent, or Firm* — Jianq Chyun IP Office

(57) ABSTRACT

A wireless displaying system, a wireless displaying device and a method for switching working mode are provided. The method includes: determining whether a video signal is received from a source device by a wireless module of the wireless displaying device during a waiting time when a processing module of the wireless displaying device works in a normal working mode; switching the processing module into a power-saving mode when the video signal is not received by the wireless module during the waiting time; receiving a specified packet from the source device by the wireless module, so as to generate a wake-up signal according to the specified packet when the processing module is in the power-saving mode; and recovering the processing module to work in the normal working mode according to the wake-up signal.

19 Claims, 4 Drawing Sheets

WIRELESS DISPLAY SYSTEM, WIRELESS DISPLAY DEVICE AND METHOD FOR SWITCHING WORKING MODE

CROSS-REFERENCE TO RELATED APPLICATION

This application claims the priority benefit of Taiwan application serial no. 102115087, filed on Apr. 26, 2013. The entirety of the above-mentioned patent application is hereby incorporated by reference herein and made a part of this specification.

BACKGROUND

1. Technical Field

The disclosure relates to a method for switching working mode. Particularly, the disclosure relates to a wireless display system, a wireless display device and a method for switching working mode adapted to the wireless display device.

2. Related Art

Generally, power consumption of any electronic device in a normal working mode is higher than power consumption of the electronic device in a power saving mode. For example, when the electronic device operates in the normal working mode, it is required to provide better working efficiency and/or data processing efficiency without considering the amount of power consumption. Conversely, when the electronic device operates in the power saving mode, in order to save power, the working efficiency and/or data processing efficiency of the electronic device are greatly decreased, or even a part of functions thereof is disabled to save the power consumption of the electronic device.

Particularly, a general wireless display device does not have a suitable working mode switching mechanism to automatically switch the wireless display device to the power saving mode when the wireless display device does not display images, and recover the wireless display device from the power saving mode to the normal working mode in advance before the wireless display device starts receiving wireless image signals.

SUMMARY

Accordingly, the disclosure is directed to a wireless display system, a wireless display device and a method for switching working mode, by which under a premise that image signal reception and processing performance are not influenced, power consumption of the wireless display device is effectively saved.

An embodiment of the disclosure provides a wireless display system including a source device and a wireless display device. The source device provides a video signal. The wireless display device includes a display unit, a wireless module and a processing module. The wireless module provides a wireless communication function. The processing module is coupled to the display unit and the wireless module. The processing module switchably works in a normal working mode or a power saving mode. When the processing module works in the normal working mode, the processing module determines whether the wireless module receives the video signal from the source device through a wireless communication protocol during a waiting time. When the wireless module receives the video signal through the wireless communication protocol during the waiting time, the processing module plays a video image on the display unit according to the video signal. When the wireless module does not receive the video signal through the wireless communication protocol during the waiting time, the processing module enters the power saving mode. The source device further sends a specified packet to the wireless module through the wireless communication protocol, where the specified packet includes a media access control address of the wireless module. When the processing module is in the power saving mode, the wireless module receives the specified packet through the wireless communication protocol, and generates a wake-up signal according to the specified packet. The processing module recovers to work in the normal working mode according to the wake-up signal.

An embodiment of the disclosure provides a wireless display device including a display unit, a wireless module and a processing module. The wireless module provides a wireless communication function. The processing module is coupled to the display unit and the wireless module. The processing module switchably works in a normal working mode or a power saving mode. When the processing module works in the normal working mode, the processing module determines whether the wireless module receives a video signal from a source device through a wireless communication protocol during a waiting time. When the wireless module receives the video signal through the wireless communication protocol during the waiting time, the processing module plays a video image on the display unit according to the video signal. When the wireless module does not receive the video signal through the wireless communication protocol during the waiting time, the processing module enters the power saving mode. When the processing module is in the power saving mode, the wireless module receives a specified packet from the source device through the wireless communication protocol, and generates a wake-up signal according to the specified packet, where the specified packet includes a media access control address of the wireless module. The processing module recovers to work in the normal working mode according to the wake-up signal.

According to another aspect, an embodiment of the disclosure provides a method for switching working mode, which is adapted to a wireless display device. The method for switching working mode includes following steps. When a processing module of the wireless displaying device works in a normal working mode, it is determined whether a wireless module of the wireless display device receives a video signal from a source device through a wireless communication protocol during a waiting time. When the wireless module receives the video signal during the waiting time, the processing module plays a video image on a display unit of the wireless display device according to the video signal. When the wireless module does not receive the video signal during the waiting time, the processing module is made to enter the power saving mode. When the processing module is in the power saving mode, the wireless module receives a specified packet from the source device through the wireless communication protocol, so as to generate a wake-up signal according to the specified packet, where the specified packet includes a media access control address of the wireless module. The processing module recovers to work in the normal working mode according to the wake-up signal.

According to the above descriptions, the wireless display device automatically enters the power saving mode when it is unnecessary to play the video image, and continuously waits for the specified packet from the source device. Thereafter, when the wireless display device in the power saving mode receives the specified packet, the wireless display device automatically recovers to work in the normal working mode to execute processing and playing procedure of the video signal. In this way, under a premise of not influencing video signal reception and processing performance, the power consumption of the wireless display device is effectively saved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

An embodiment of the disclosure provides a wireless display system, in which a wireless display device can automatically enter a power saving mode after a period time of idle or standby. Thereafter, when a source device in the wireless display system is about to send a video signal to the wireless display device, before the source device sends the video signal, the source device sends a specified packet corresponding to the wireless display device to the wireless display device in advance. When the wireless display device receives the specified packet, the wireless display device automatically recovers from the power saving mode to work in the normal working mode, so as to provide a subsequent video playing service. In this way, under a premise of not influencing video signal reception and processing performance, the power consumption of the wireless display device is effectively saved.

Moreover, the disclosure further discloses a wireless display device and a method for switching working mode adapted to the wireless display device. In order to fully convey the spirit of the disclosure, embodiments are provided below for descriptions.

Figure 1:
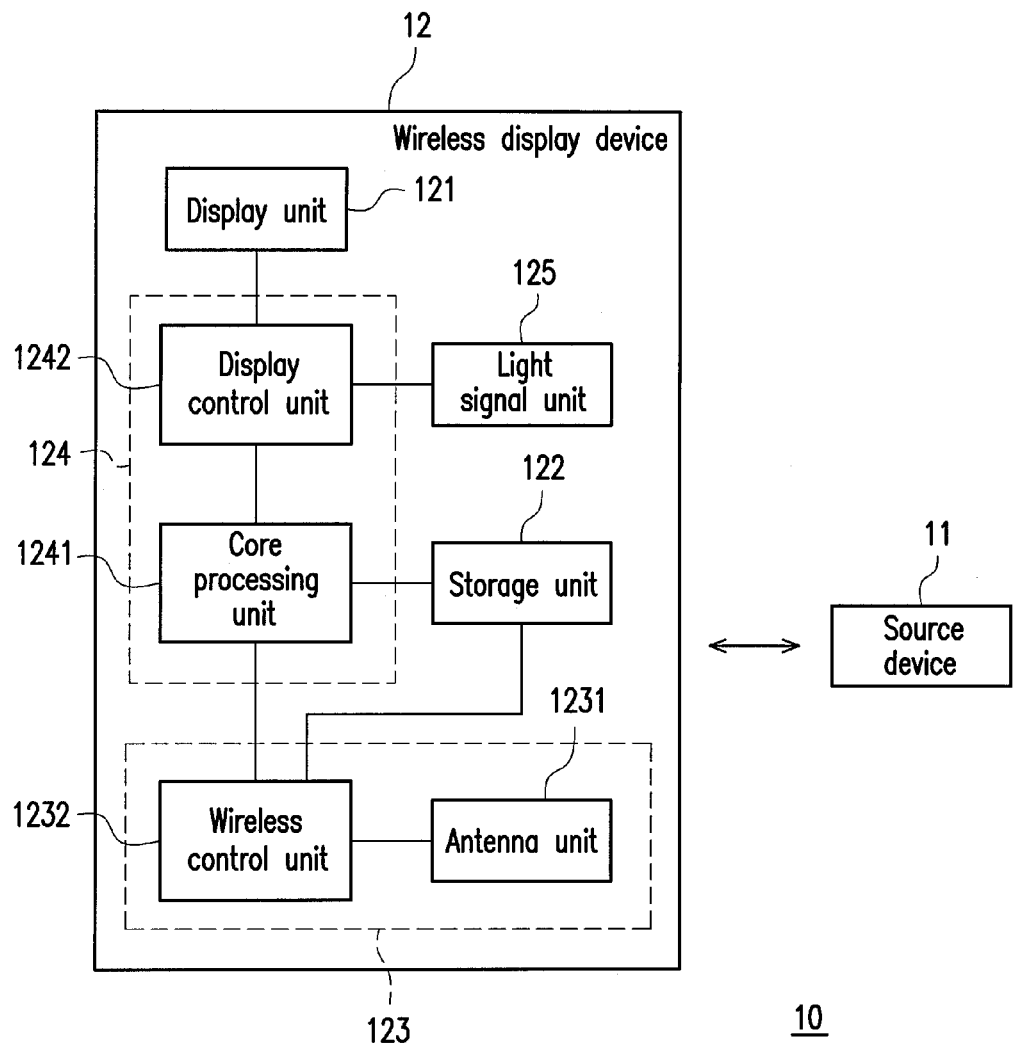
FIG. 1 is a functional block diagram of a wireless display system according to an embodiment of the disclosure.

FIG. 1 is a functional block diagram of a wireless display system according to an embodiment of the disclosure. Referring to FIG. 1, the wireless display system 10 includes a source device 11 and a wireless display device 12. The number of the source device 11 and the wireless display device 12 can be one or plural, which is not limited by the disclosure.

In the present embodiment, the source device 11 is, for example, an electronic device having a wireless transmission function such as a mobile phone, a personal digital assistant (PDA), a smart phone, a notebook, a desktop computer, or a tablet PC, etc.

The source device 11 can provide a video signal and/or a video audio signal to the wireless display device 12 through a wireless transmission manner. For example, the source device 11 converts video or video audio data stored in a storage medium such as a memory, a hard disk or an external storage device, etc. into a video signal or a video audio signal, and transmits the video signal or the video audio signal to the wireless display device 12 through a wireless transmission manner. Moreover, the source device 11 can also convert data corresponding a display image on a display thereof or an extending desktop of the display into a video signal, and transmit the video signal to the wireless display device 12 through the wireless transmission manner. It should be noticed that the video signal is unifiedly used as an example of the signal provided by the source device 11 in following descriptions.

The wireless display device 12 is, for example, a display device having functions of receiving, processing and playing wireless video signals such as a smart TV or a smart display panel, etc. In the present embodiment, the wireless display device 12 includes a display unit 121, a storage unit 122, a wireless module 123, a processing module 124 and a light signal unit 125.

The display unit 121 can display video images. In the present embodiment, the display unit 121 is, for example, a liquid crystal display (LCD), a light-emitting diode (LED) display, a field emission display (FED) or other types of displays or display panels, which is not limited by the disclosure.

The storage unit 122 may have one or a plurality of databases for storing data of various types. In the present embodiment, the storage unit 122 can be a volatile memory, a non-volatile memory or a combination thereof. The volatile memory is, for example, a random access memory (RAM). The non-volatile memory includes a read-only memory (ROM) and/or a flash memory, where the ROM is, for example, a programmable read-only memory (PROM), an electrically alterable read only memory (EAROM), an erasable programmable read only memory (EPROM) and/or an electrically erasable programmable read only memory (EEPROM), etc. Moreover, the storage unit 122 may include an optical disk, a hard disk and/or a flash drive, etc., which is not limited by the disclosure.

The wireless module 123 may provide a wireless communication function. For example, the wireless module 123 may include an antenna unit 1231 and a wireless control unit 1232. The antenna unit 1231 is, for example, a solid antenna or a planar antenna capable of emitting a radio frequency (RF) signal in form of electromagnetic wave and receiving electromagnetic waves from other electronic devices (for example, the source device 11). The wireless control unit 1232 is, for example, a wireless communication chip set or a wireless communication interface card, and is configured to resolve the RF signal in the electromagnetic wave received by the antenna unit 1231 or convert a digital signal to be emitted into the RF signal, and transmit the RF signal to the antenna unit 1231.

In the present embodiment, the wireless module 123 can selectively establish and/or disable a wireless connection with the source device 11, and can receive a video signal or other packets from the source device 11 through one or a plurality of wireless communication protocols predetermined or selected by the user. Taking the wireless control unit 1232 as an example, the wireless control unit 1232 can serve as a wireless network interface of the wireless display device 12 and is in charge of establishment of the wireless connection and encapsulation and analysis of the packet.

Moreover, the aforementioned wireless communication protocol can be a third generation (3G) wireless communication technique, bluetooth, general packet radio service (GPRS), high speed downlink packet access (HSDPA), high speed uplink packet access (HSUPA), wireless-fidelity (Wi- Fi), wireless wide area network (WWAN) and a 3G partnership project long term evolution (3GPP LTE), etc., which is not limited by the disclosure.

The processing module 124 is coupled to the display unit 121, the storage unit 122 and the wireless module 123, which is used to manage and process most of the tasks of the wireless display device 12 and execute processing and playing procedures such as decoding or transcoding, etc. of the video signals. In the present embodiment, the processing module 124 is, for example, coupled to the display unit 121, the storage unit 122 and the wireless module 123 through general purpose input/output (GPIO) interfaces.

Particularly, in the present embodiment, the processing module 124 switchably works in a normal working mode or a power saving mode according to a predetermined working mode switching mechanism. For example, in the normal working mode, when the wireless module 123 receives a video signal from the source device 11 through a wireless communication protocol, the processing module 124 can automatically execute a video processing and playing procedure or execute the same according to an operation of the user, so as to play a corresponding video image on the display unit 121 according to the received video signal. For example, when the wireless module 123 receives the video signal, the wireless module 123 first stores the received video signal in the storage unit 122 in form of data. Then, the processing module 124 obtains the data of the video signal to be processed from the storage unit 122, and plays the corresponding video image on the display unit 121 by executing the video processing and playing procedure.

It should be noticed that in the present embodiment, the display unit 121 and the processing module 124 are electronic components with larger power consumption in the wireless display device 12, and operation of the display unit 121 directly correlates with a working mode of the processing module 124. Therefore, if the processing module 124 can automatically switch the working mode thereof to the power saving mode when it is unnecessary to process the video signal and/or unnecessary to play the video image, the whole power consumption of the wireless display device 12 can be greatly decreased.

Therefore, in the present embodiment, when the wireless module 123 does not receive any video signal through the wireless communication protocol during a predetermined waiting time (which is referred to as a first waiting time hereinafter), the processing module 124 automatically enters the power saving mode. When the processing module 124 is in the power saving mode, the wireless module 123 continuously monitors and waits for a specified packet (for example, from the source device 11) through the wireless communication protocol. When the wireless module 123 receives the specified packet, the wireless module 123 generates a wake-up signal according to the specified packet, and transmits the wake-up signal to the processing module 124. Then, when the processing module 124 detects and/or receives the wake-up signal, the processing module 124 recovers to work in the original normal working mode according to the wake-up signal.

Particularly, the aforementioned specified packet has a special format to avoid confusing with other types of packet. For example, in the present embodiment, packet content of the specified packet may include a media access control address (MAC address) of the wireless module 123 set in a specific manner. In this way, the wireless module 123 can quickly identify the specified packet from a large amount of wireless network packets.

In the present embodiment, the specified packet can be composed of a broadcast segment and a plurality of specified segments, and the specified segments are respectively the MAC address of the wireless module 123. For example, it is assumed that the MAC address of the wireless module 123 is "11:22:33:44:55:66", and the broadcast segment is "FFFFFFFFFF" (FF:FF:FF:FF:FF:FF is a predetermined broadcast address of a general MAC address). Now, the packet content of the specified packet to be monitored and waited by the wireless module 123 is, for example, composed of one "FFFFFFFFFF" and "112233445566" repeated by multiple times.

Taking "112233445566" repeated by 16 times as an example, the packet content of the specified packet to be monitored and waited by the wireless module 123 is, for example, "FFFFFFFFFF 112233445566 112233445566 112233445566 112233445566 112233445566 112233445566 112233445566 112233445566 112233445566 112233445566 112233445566 112233445566 112233445566 112233445566 112233445566 112233445566". However, it should be noticed that the above specified packet is only an example of the disclosure, which can be adjusted according to an actual design requirement.

Moreover, the MAC address of the wireless module 123 in the specified packet is, for example, obtained through an address resolution protocol (ARP). For example, it is assumed that a wireless connection is not ever established between the source device 11 and the wireless module 123, the source device 11 can obtain the MAC address of the wireless module 123 through the ARP. For example, in the ARP, the source device 11 can send an ARP request to the wireless module 123. When the wireless module 123 receives the ARP request, the wireless module 123 can send a response message including the MAC address of the wireless module 123 to the source device 11. When the source device 11 receives the response message, the source device 11 analyzes the packet content of the response message, and obtains the MAC address of the wireless module 123 from the analyzed packet content. Then, the source device 11 generates a specified packet corresponding to the wireless module 123 according to the MAC address of the wireless module 123.

When the source device 11 sends the specified packet to the wireless module 123 for the next time, the source device 11 is unnecessary to repeatedly perform the ARP, and can easily and quickly obtain the stored MAC address of the wireless module 123 according to a table look-up method, so as to generate the specified packet corresponding to the wireless module 123. Moreover, in an embodiment, the source device 11 can also directly query a connection record or a packet transceiving record between the source device 11 and the wireless module 12 to generate the specified packet corresponding to the wireless module 123, and send the specified packet to the wireless module 123.

Moreover, in an embodiment, if the wireless display system 10 includes a plurality of wireless display devices 12, the source device 11 can also respectively obtain the MAC address of each or a specific wireless display device 12 through the aforementioned ARP, and generate the corresponding specified packet according to the obtained MAC address. Therefore, when the source device 11 is about to send a video signal to a target wireless display device (for example, one of a plurality of the wireless display devices 12), the source device 11 can send the specified packet corresponding to the target wireless display device to the target wireless display device to ensure that the target display device has recovered to work in the original normal working mode before the source device 11 transmits the video signal to the target wireless display device.

Alternatively, in an embodiment, if the wireless display device 12 has a plurality of wireless modules 123 or wireless network interface cards, and each of the wireless modules 123 or wireless network interface cards has a respective MAC address, the source device 11 can also obtain the MAC addresses of all of or a specific one of the wireless modules 123 or wireless network interface cards according to the aforementioned method, so as to produce the corresponding specified packet.

Besides the aforementioned first waiting time, in an embodiment, another dormancy waiting time (which is referred to as a second waiting time hereinafter) can be set for the wireless control unit 1232. If the wireless control unit 1232 does not establish a wireless connection with any electronic device within the second waiting time, or is idled for more than the second waiting time, the wireless control unit 1232 automatically enters a dormancy mode to save the power consumption of the wireless module 123. Particularly, when the wireless control unit 1232 enters the dormancy mode, it represents that there is no video signal required to be processed immediately by the processing module 124. Therefore, after the wireless control unit 1232 enters the dormancy mode, the processing module 124 synchronously enters the power saving mode.

It should be noticed that in the present embodiment, time lengths of the first waiting time and the second waiting time can be the same. However, in another embodiment, the time lengths of the first waiting time and the second waiting time can also be different, which is determined according to an actual design requirement, and is not limited by the disclosure.

It should be noticed that although the processing module 124 can synchronously enter the power saving mode as the wireless control unit 1232 enters the dormancy mode, the procedure that the processing module 123 recovers to work in the normal working mode is still non-related with a dormancy wake-up mechanism of the wireless control unit 1232. For example, in an embodiment, when the wireless control unit 1232 in the dormancy mode receives a packet having a connection request, the wireless control unit 1232 recovers to work in the normal working mode to establish the wireless connection with the electronic device (for example, the source device 11) and prepares to execute a subsequent packet transceiving operation, etc. However, as long as the wireless control unit 1232 does not receive the waited specified packet, the wireless control unit 1232 does not generate the wake-up signal.

In other words, the aforementioned specified packet is used for switching the processing module 124 from the power saving mode to the normal working mode, and is non-related with a dormancy/wake-up mechanism of the general wireless module. Particularly, since a packet format and/or packet content of the specified packet of the disclosure is specially designed, it is completely different to a general packet including the connection request, and is highly recognizable in an actual application.

On the other hand, in view of the source device 11, when the source device 11 is about to transmit the video signal to the wireless module 123, the source device 11 can execute a generation and sending procedure of a specified packet in advance. Through the generation and sending procedure of the specified packet, the source device 11 can send the specified packet waited by the wireless module 123 to the wireless module 123, so as to switch the processing module 124 probably or already in the power saving mode to the normal working mode. Then, after the processing module 124 recovers to work in the normal working mode, the source device 11 sends the video signal to the wireless module 123. In this way, although the processing module 124 automatically switches the working mode thereof to the power saving mode to reduce the power consumption when it is unnecessary to play video images, before the source device 11 transmits the video signal to the wireless module 123, the processing module 124 already recovers to work in the normal working mode in advance to prepare or start executing the video processing and playing procedure required for processing and playing the video signal.

The light signal unit 125 is coupled to the processing module 124, and light signal unit 125 can display a corresponding light signal according to a current working mode of the processing module 124. In this way, according to the light signal displayed by the light signal unit 125, the user can clearly know the current working mode of the processing module 124 or the wireless display device 12.

For example, when the processing module 124 is in the power saving mode, the light signal unit 125 can display a first light signal. When the processing module 124 works in the normal working mode, the light signal unit 125 can display a second light signal. In the present embodiment, the first light signal and the second light signal are, for example, lights of different colors, for example, the first light signal is an orange light and the second light signal is a green light. Alternatively, in the present embodiment, the first light signal and the second light signal can also be lights with different twinkling frequencies or brightness, which is not limited by the disclosure. Moreover, the presentation method of the first light signal and the second light signal can be changed according to an actual design requirement, for example, the light colors, the twinkling frequencies or brightness, etc. of the first light signal and the second light signal can be changed. Alternatively, in an embodiment, types of the light signal can be adaptively increased, which is not limited by the disclosure.

Implementation details of the wireless display device 12 of the present embodiment are described in detail below. In the present embodiment, the processing module 124 may include a core processing unit 1241 and a display control unit 1242. When the processing module 124 works in the normal working mode, it represents that the core processing unit 1241 and the display control unit 1242 simultaneously or sequentially work in the normal working mode. Conversely, when the processing module 124 is in the power saving mode, it represents that the core processing unit 1241 and the display control unit 1242 are simultaneously or sequentially in the power saving mode.

The core processing unit 1241 is a core component of the wireless display device, which handles most of the works of the wireless display device 12. In the present embodiment, the core processing unit 1241 is, for example, a central processing unit (CPU) or a microprocessor, etc. The core processing unit 1241 is coupled to the wireless control unit 1232. In the present embodiment, the core processing unit 1241 is, for example, coupled to the wireless control unit 1232 through a universal input/output interface, a secure digital input/output (SDIO) interface or a universal serial bus (USB) interface.

When the core processing unit 1241 is in the normal working mode, the core processing unit 1241 can process the video signal received from the wireless control unit 1232 into a video stream. For example, the core processing unit 1241 can decode or transcode the video signal. Moreover, a format of the video stream is determined according to a type of the transmission interface between the core processing unit 1241 and the display control unit 1242, which is not limited by the disclosure.

The display control unit 1242 is coupled to the core processing unit 1241 and the display unit 121. In the present embodiment, the display control unit 1242 can be respectively coupled to the core processing unit 1241 and the display unit 121 through the universal input/output interface. Alternatively, the display control unit 1242 can be coupled to the core processing unit 1241 through various video or video/audio signal transmission interface such as a digital visual interface (DVI), a video graphics array (VGA) interface or a high definition multimedia interface (HDMI), etc., which is not limited by the disclosure.

When the display control unit 1242 is in the normal working mode, it can play a corresponding video image on the display unit 121 according to the video stream received from the core processing unit 1241. For example, the display control unit 1242 can receive the video stream provided by the core processing unit 1241, and converts the received video stream into playable signals complied with a play format of the display unit 121, for example, low-voltage differential signalling (LVDS). Then, the playable signals are transmitted to the display unit 121 to play the corresponding video image through the display unit 121.

In the present embodiment, when the core processing unit 1241 working in the normal working mode does not receive any video signal from the wireless control unit 1232 during a predetermined waiting time (i.e. the aforementioned first waiting time), the core processing unit 1241 automatically enters the power saving mode, and controls the display control unit 1242 to synchronously enter the power saving mode. For example, the core processing unit 1241 sends a control signal to the display control unit 1242 through the universal input/output interface, so as to control the display control unit 1242 to synchronously switch to the power saving mode according to the control signal. Alternatively, the display control unit 1242 can also learn or analyze a power supply state of the core processing unit 1241 through the universal input/output interface, and determines whether to enter the power saving mode according to the power supply state of the core processing unit 1241. For example, when the power supply state of the core processing unit 1241 is low power or low power consumption, the display control unit 1242 can automatically enter the power saving mode. Comparatively, when the power supply state of the core processing unit 1241 is high power or high power consumption, the display control unit 1242 can automatically recover to work in the normal working mode.

Moreover, taking the core processing unit 1241 coupled to the display control unit 1242 through the video or video/audio signal transmission interface such as the digital visual interface as an example, the core processing unit 1241 can also transmit one or a plurality of pulse signals to the display control unit 1242 through one or a plurality of hot plug detect pins, and control the display control unit 1242 to switch between the power saving mode and the normal working mode by using the one or plural pulse signals.

However, the disclosure is not limited thereto. In an embodiment, when the display control unit 1242 does not receive any video stream from the core processing unit 1241 during the first waiting time or other predetermined waiting time, the display control unit 1242 can also automatically enter the power saving mode.

On the other hand, in the present embodiment, when the core processing unit 1241 in the power saving mode receives the wake-up signal from the wireless control unit 1232, the core processing unit 1241 can recover to work in the normal working mode according to the wake-up signal, and control the display control unit 1242 to synchronously recover to the normal working mode. For example, the wireless control unit 1232 can notify the core processing unit 1241 through a signal level variation of one or a plurality of pins on the universal input/output interface, such that the core processing unit 1241 recovers to work in the normal working mode. For example, when the core processing unit 1241 detects that a signal level of one or a plurality of pins on the universal input/output interface between the core processing unit 1241 and the wireless control unit 1232 is increased to a high level or is decreased to a low level, the core processing unit 1241 recovers to work in the normal working mode.

Alternatively, the wireless control unit 1232 can also send a pulse signal to the core processing unit 1241 through the aforementioned various interface. Then, when the core processing unit 1241 receives the pulse signal, the core processing unit 1241 automatically recovers to work in the normal working mode. In other words, implementation of the wake-up signal can be determined according to an actual design requirement, which is not limited by the disclosure.

In an embodiment, the wireless control unit 1232 can also control the core processing unit 1241 to switch between the power saving mode and the normal working mode through a signal level variation of one or a plurality of pins on the universal input/output interface between the wireless control unit 1232 and the core processing unit 1241. For example, the signal transmission interface such as the universal input/output interface between the wireless control unit 1232 and the core processing unit 1241 may have one or a plurality of preset pins. When the wireless control unit 1232 enters the dormancy mode, the wireless control unit 1232 controls a signal level of the one or a plurality of preset pins to a first signal level (for example, a low level), and the core processing unit 1241 enters the power saving mode according to the first signal level. Thereafter, when the wireless control unit 1232 receives the aforementioned specified packet, the wireless control unit 1232 controls the signal level of the one or a plurality of preset pins to a second signal level (for example, a high level), and the core processing unit 1241 recovers to work in the normal working mode according to the second signal level.

Moreover, in the present embodiment, the display control unit 1242 can also be coupled to the light signal unit 125. When the display control unit 1242 enters the power saving mode, the display control unit 1242 controls the light signal unit 125 to display the aforementioned first light signal. When the display control unit 1242 recovers to work in the normal working mode, the display control unit 1242 controls the light signal unit 125 to display the aforementioned second light signal. Alternatively, in another embodiment, switching of the light signal on the light signal unit 125 can also be controlled by the core processing unit 1241, which is not limited by the disclosure.

Figure 2:
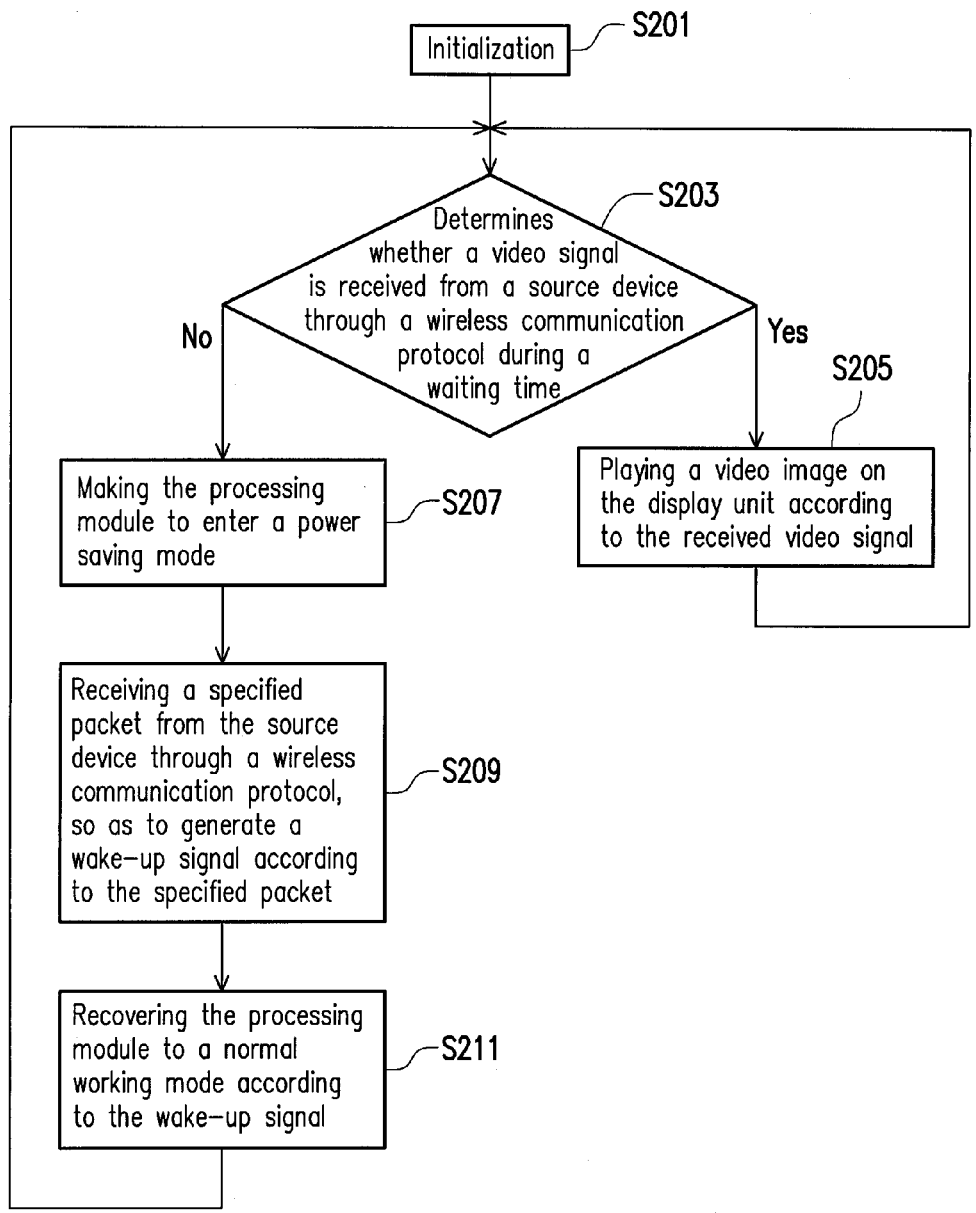
FIG. 2 is a flowchart illustrating a method for switching working mode according to an embodiment of the disclosure.

According to another aspect, the disclosure provides a method for switching working mode. For example, FIG. 2 is a flowchart illustrating a method for switching working mode according to an embodiment of the disclosure. The method for switching working mode is described below with reference of the wireless display system 10 of FIG. 1 and the flowchart of FIG. 2.

Referring to FIG. 1 and FIG. 2, first, in step S201, the wireless display device 12 performs initialization. For example, the processing module 124 executes a booting procedure. Now, the processing module 124 works in a predetermined working mode. In an embodiment, if the predetermined working mode is the power saving mode, after the step S201, a step S209 is executed. However, in the step S201 of the present embodiment, the processing module 124 works in the normal working mode.

After the step S201 is executed, in step S203, the processing module 124 determines whether the wireless module 123 receives any video signal from the source device 11 through a wireless communication protocol during a waiting time (i.e. the aforementioned first waiting time). If the wireless module 123 receives the video signal from the source device 11 during the first waiting time, in step S205, the processing module 124 plays a video image on the display unit 121 according to the received video signal. After the processing module 124 completes processing the received video signal, after the step S205, the processing module 124 repeatedly executes the step S203.

Moreover, after the step S203, if the wireless module 123 does not receive any video signal from the source device 11 during the first waiting time, in step S207, the processing module 124 enters the power saving mode. Then, when the processing module 124 is in the power saving mode, in step S209, the wireless module 123 receives a specified packet from the source device 11 through the wireless communication protocol, so as to generate a wake-up signal according to the specified packet. Then, after the wireless module 123 generates the wake-up signal, in step S211, the processing module 124 recovers to work in the normal working mode according to the wake-up signal, and repeatedly executes the step S203.

In an actual application, before the source device 11 transmits the video signal to the wireless display device 12, the source device 11 is required to establish a wireless connection with the wireless display device 12 (i.e. the wireless module 123) in advance. Another embodiment is provided below to describe the method for switching working mode of the disclosure.

Figure 3:
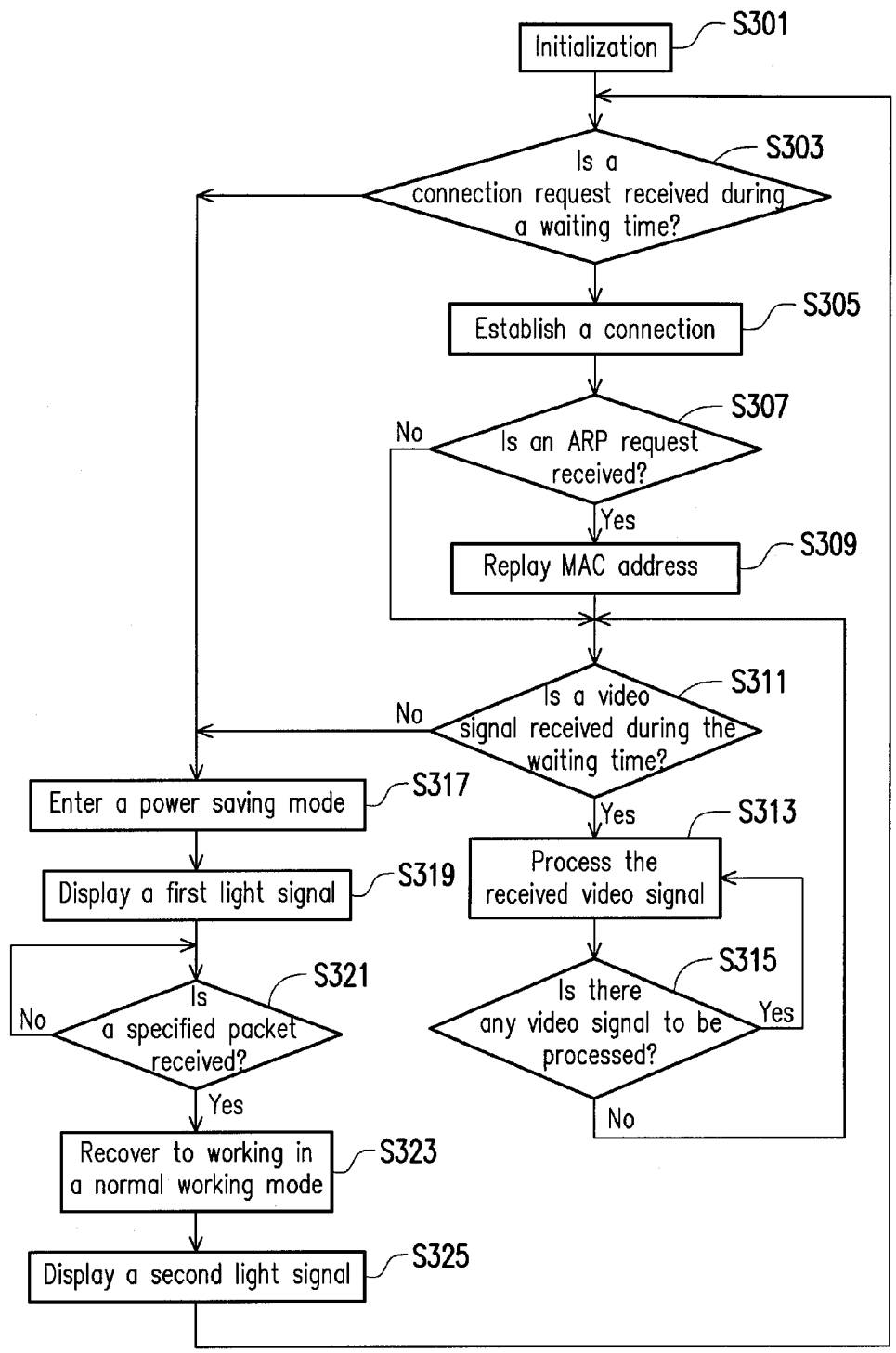
FIG. 3 is a flowchart illustrating a method for switching working mode according to another embodiment of the disclosure.

FIG. 3 is a flowchart illustrating a method for switching working mode according to another embodiment of the disclosure. Referring to FIG. 1 and FIG. 3, first, in step S301, the wireless display device 12 performs initialization. For example, the processing module 124 executes a booting procedure. Now, the processing module 124 works in a predetermined working mode. In an embedment, if the predetermined working mode is the power saving mode, after the step S301, a step S319 is executed. However, in the step S301 of the present embodiment, the processing module 124 works in the normal working mode.

After the step S301 is executed, in step S303, the wireless module 123 determines whether a connection request from the source device 11 is received within a waiting time. For example, the aforementioned connection request can be a packet including the connection request. Then, if the wireless module 123 does not receive any connection request from the source device 11 within the waiting time, or the wireless module 123 is idled for more than the waiting time, in step S317, the processing module 124 automatically enters the power saving mode, or is controlled by the wireless module 123 to enter the power saving mode. For example, the aforementioned waiting time is, for example, a dormancy waiting time (i.e. the second waiting time) of the wireless control unit 1232.

For example, when the wireless control unit 1232 does not receive any connection request from the source device 11 during a dormancy waiting time thereof, or the wireless module 123 is idled for more than the dormancy waiting time, the wireless control unit 1232 automatically enters the dormancy mode. Then, the processing module 124 automatically enters the power saving mode, or is controlled by the wireless control unit 1232 to enter the power saving mode after the wireless control unit 1232 enters the dormancy mode.

On the other hand, after the step S303, if the wireless module 123 receives a connection request (for example, a packet including the connection request sent by the source device 11) from the source device 11 within the waiting time, in step S305, the wireless module 123 and the source device 11 establish a wireless connection. Then, after the wireless connection is established, in step S307, the wireless module 123 determines whether an address resolution protocol request (for example, a packet including the address resolution protocol request) is received from the source device 11. In the step S307, if the wireless module 123 receives the address resolution protocol request from the source device 11, in step S309, the wireless module 123 sends or replies an MAC address of the wireless module 123 to the source device 11 through an address resolution protocol.

Moreover, in the step S307, if the wireless module 123 does not receive the address resolution protocol request from the source device 11, in step S311, the processing module 124 determines whether the wireless module 123 receives any video signal from the source device 11 through a wireless communication protocol during a waiting time (i.e. the aforementioned first waiting time). Then, if the wireless module 123 does not receive any video signal from the source device 11 during the first waiting time, in step S317, the processing module 124 enters the power saving mode.

Alternatively, in the step S311, if the wireless module 123 receives the video signal from the source device 11 during the first waiting time, in step S313, the processing module 124 processes the received video signal and plays a video image on the display unit 121 according to the received video signal. After the step S313 is executed, in step S315, the processing module 124 determines whether a video signal to be processed still exists (i.e. the video signal that is already received by the wireless module 123 but is still not processed by the processing module 124). If the video signal to be processed still exists, after the step S315, the processor 124 repeatedly executes the step S313 to process and play the image signal required to be processed.

Moreover, if the processing module 124 determines that none video signal to be processed exists, after the step S315, the processing module 124 repeatedly executes the step S311 to wait and determine whether any video signal is received from the source device 11 during a new second waiting time.

After the step S317, when the processing module 124 enters the power saving mode, in step S319, the light signal unit 125 displays the first light signal (for example, an orange light). Then, after the step S319, in step S321, the wireless module 123 determines whether a specified packet is received from the source device 11. Then, after the step S321, when the wireless module 123 receives the specified packet from the source device 11, in step S323, the processing module 124 recovers to work in the normal working mode, and in step S325, the light signal unit 125 displays the second light signal (for example, a green light).

Figure 4:
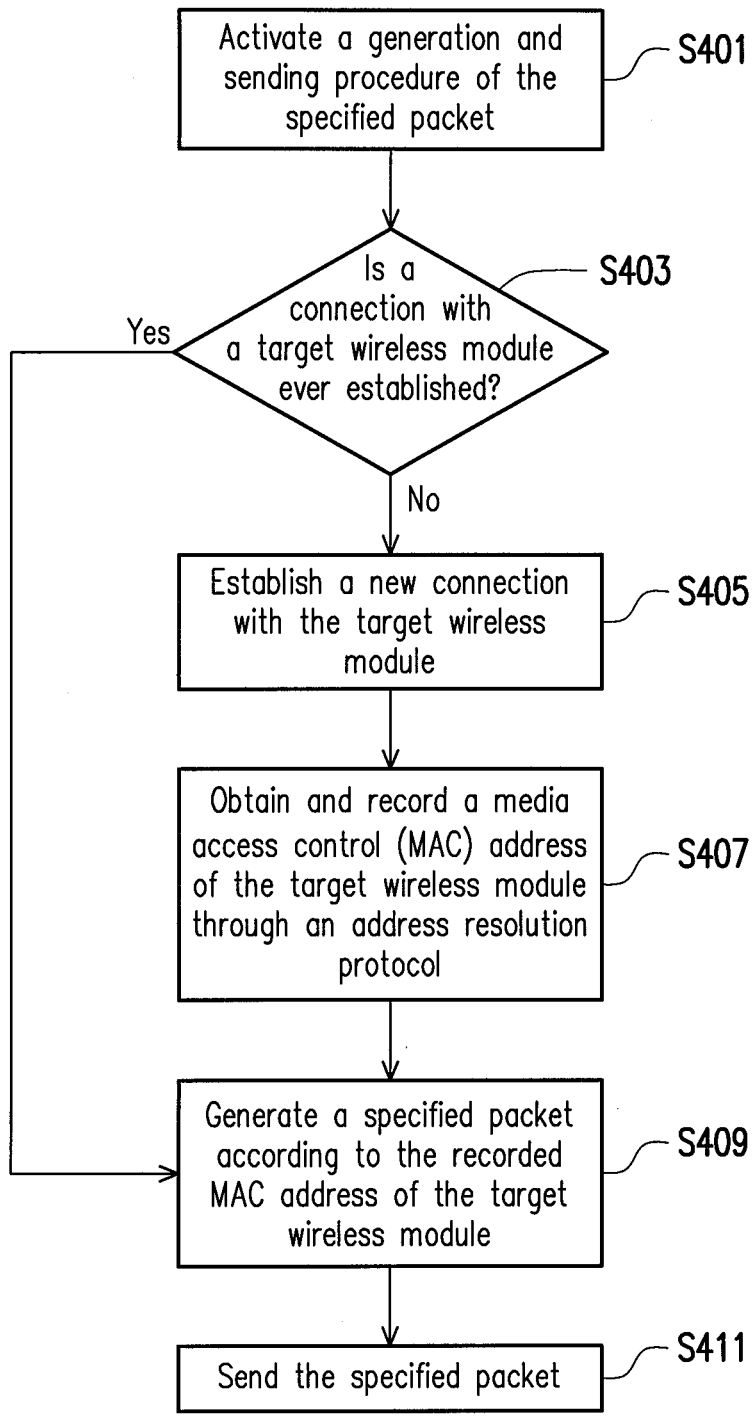
FIG. 4 is a flowchart illustrating a generation and sending procedure of a specified packet according to an embodiment of the disclosure.

In view of the source device 11, for example, FIG. 4 is a flowchart illustrating a generation and sending procedure of a specified packet according to an embodiment of the disclosure. Referring to FIG. 1 and FIG. 4, first, in step S401, the source device 11 activates a generation and sending procedure of a specified packet. Then, in step S403, the source device 11 determines whether a connection with a target wireless module (for example, the wireless module 123) is ever established. For example, the source device 11 can inquire a connection record to determine whether the connection with the wireless module 123 is ever established. When the source device 11 does not ever establish any connection with the wireless module 123, in step S405, the source device 11 establishes a new connection with the wireless module 123.

After the new connection is established, in step S407, the source device 11 obtains and records the MAC address of the wireless module 123 through an address resolution protocol, so as to generate the specified packet corresponding to the wireless module 123. Then, in step S409, the source device 11 generates the specified packet according to the recorded MAC address of the wireless module 123. Then, in step S411, the source device 11 sends the specified packet to the wireless module 123 to ensure recovering the processing module 124 to the normal working mode. Moreover, in the step S403, if the source device 11 determines that the connection with the wireless module 123 is ever established, in step S409, the source device 11 generates the specified packet corresponding to the wireless module 123 according to the recorded MAC address of the wireless module 123.

Those skilled in the art can learn enough instructions and recommendations for the aforementioned method and various steps of the disclosure from the descriptions of the aforementioned embodiments, detailed description thereof is not repeated.

In summary, according to the wireless display system, the wireless display device and the method for switching working mode of the disclosure, before the source device sends the video or video/audio signal to the wireless display device, the wireless display device is waken up from the power saving mode to the normal working mode through the specified packet corresponding to the wireless display device. Moreover, the packet content and/or packet format of the specified packet is specially designed, so that it is not easy to be confused with general packets.

In this way, under a premise of not influencing video signal reception and processing performance, the power consumption of the wireless display device is effectively saved. Particularly, in view of hardware, implementation details of various hardware components and signal transmission interfaces of the wireless display device are disclosed in the aforementioned embodiments, which can be suitably combined with an existing wireless display device. Therefore, the disclosure substantially has a high degree of practicality.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A wireless display system, comprising:
   a source device, providing a video signal; and
   a wireless display device, comprising:
   a display unit;
   a wireless module, providing a wireless communication function; and
   a processing module, coupled to the display unit and the wireless module, wherein the processing module switchably works in a normal working mode or a power saving mode,
   wherein when the processing module works in the normal working mode, the processing module determines whether the wireless module receives the video signal from the source device through a wireless communication protocol during a waiting time,
   wherein when the wireless module receives the video signal through the wireless communication protocol during the waiting time, the processing module plays a video image on the display unit according to the video signal,
   wherein when the wireless module does not receive the video signal through the wireless communication protocol during the waiting time, the processing module enters the power saving mode,
   wherein the source device further sends a specified packet to the wireless module through the wireless communication protocol, and the specified packet comprises a media access control address of the wireless module,
   wherein when the processing module is in the power saving mode, the wireless module receives the specified packet through the wireless communication protocol, and generates a wake-up signal according to the specified packet,
   wherein the processing module recovers to work in the normal working mode according to the wake-up signal.

2. The wireless display system as claimed in claim 1, wherein the processing module comprises:
   a core processing unit, coupled to the wireless module, wherein the core processing unit processes the video signal into a video stream;
   a display control unit, coupled to the core processing unit and the display unit, wherein the display control unit plays the video image on the display unit according to the video stream,
   wherein when the core processing unit does not receive the video signal during the waiting time, the core processing unit enters the power saving mode, and controls the display control unit to synchronously enter the power saving mode,
   wherein the core processing unit recovers to work in the normal working mode according to the wake-up signal, and controls the display control unit to synchronously recover to the normal working mode.

3. The wireless display system as claimed in claim 2, wherein the wireless display device further comprises a light signal unit, the light signal unit is coupled to the display control unit,
   wherein when the display control unit enters the power saving mode, the display control unit controls the light signal unit to display a first light signal, and when the display control unit recovers to work in the normal working mode, the display control unit controls the light signal unit to display a second light signal.

4. The wireless display system as claimed in claim 1, wherein the source device further determines whether a connection with the wireless module is ever established,
   wherein when the source device does not ever establish the connection with the wireless module, the source device establishes a new connection with the wireless module, and obtains and records the media access control address of the wireless module through an address resolution protocol after establishing the new connection, so as to generate the specified packet.

5. The wireless display system as claimed in claim 4, wherein when the connection is ever established between the source device and the wireless module, the source device generates the specified packet according to the recorded media access control address of the wireless module.

6. The wireless display system as claimed in claim 1, wherein in the normal working mode, the wireless module further determines whether a connection request is received from the source device during another waiting time, wherein when the wireless module receives the connection request during the other waiting time, the wireless module establishes a new connection with the source device, and determines whether an address resolution protocol request is received from the source device, wherein when the wireless module receives the address resolution protocol request from the source device, the wireless module sends the media access control address of the wireless module to the source device through an address resolution protocol.

7. The wireless display system as claimed in claim 6, wherein when the wireless module does not receive the connection request during the other waiting time, the processing module enters the power saving mode.

8. The wireless display system as claimed in claim 1, wherein the specified packet is composed of a broadcast segment and a plurality of specified segments, and each of the specified segments is the media access control address of the wireless module.

9. A wireless display device, comprising:
a display unit,
a wireless module, providing a wireless communication function; and
a processing module, coupled to the display unit and the wireless module, wherein the processing module switchably works in a normal working mode or a power saving mode,
wherein when the processing module works in the normal working mode, the processing module determines whether the wireless module receives a video signal from a source device through a wireless communication protocol during a waiting time,
wherein when the wireless module receives the video signal through the wireless communication protocol during the waiting time, the processing module plays a video image on the display unit according to the video signal,
wherein when the wireless module does not receive the video signal through the wireless communication protocol during the waiting time, the processing module enters the power saving mode,
wherein when the processing module is in the power saving mode, the wireless module receives a specified packet from the source device through the wireless communication protocol, and generates a wake-up signal according to the specified packet, and the specified packet comprises a media access control address of the wireless module,
wherein the processing module recovers to work in the normal working mode according to the wake-up signal.

10. The wireless display device as claimed in claim 9, wherein the processing module comprises:
a core processing unit, coupled to the wireless module, wherein the core processing unit processes the video signal into a video stream;
a display control unit, coupled to the core processing unit and the display unit, wherein the display control unit plays the video image on the display unit according to the video stream,
wherein when the core processing unit does not receive the video signal during the waiting time, the core processing unit enters the power saving mode, and controls the display control unit to synchronously enter the power saving mode,
wherein the core processing unit recovers to work in the normal working mode according to the wake-up signal, and controls the display control unit to synchronously recover to the normal working mode.

11. The wireless display device as claimed in claim 10, further comprising a light signal unit coupled to the display control unit,
wherein when the display control unit enters the power saving mode, the display control unit controls the light signal unit to display a first light signal, and when the display control unit recovers to work in the normal working mode, the display control unit controls the light signal unit to display a second light signal.

12. The wireless display device as claimed in claim 9, wherein in the normal working mode, the wireless module further determines whether a connection request is received from the source device during another waiting time,
wherein when the wireless module receives the connection request during the other waiting time, the wireless module establishes a new connection with the source device, and determines whether an address resolution protocol request is received from the source device,
wherein when the wireless module receives the address resolution protocol request from the source device, the wireless module sends the media access control address of the wireless module to the source device through an address resolution protocol.

13. The wireless display device as claimed in claim 12, wherein when the wireless module does not receive the connection request during the other waiting time, the processing module enters the power saving mode.

14. The wireless display device as claimed in claim 9, wherein the specified packet is composed of a broadcast segment and a plurality of specified segments, and each of the specified segments is the media access control address of the wireless module.

15. A method for switching working mode, adapted to a wireless display device, the method for switching working mode comprising:
determining whether a wireless module of the wireless display device receives a video signal from a source device through a wireless communication protocol during a waiting time when a processing module of the wireless displaying device works in a normal working mode;
playing a video image on a display unit of the wireless display device by the processing module according to the video signal when the wireless module receives the video signal during the waiting time;
making the processing module to enter the power saving mode when the wireless module does not receive the video signal during the waiting time;
receiving a specified packet from the source device by the wireless module through the wireless communication protocol when the processing module is in the power saving mode, so as to generate a wake-up signal according to the specified packet, wherein the specified packet comprises a media access control address of the wireless module; and
recovering the processing module to work in the normal working mode according to the wake-up signal.

16. The method for switching working mode as claimed in claim 15, wherein the step of playing the video image on the display unit by the processing module according to the video signal comprises:
processing the video signal into a video stream by a core processing unit of the processing module; and
playing the video image on the display unit by a display control unit of the processing module according to the video stream, wherein the step of making the processing module to enter the power saving mode comprises:

making the core processing unit to enter the power saving mode; and controlling the display control unit to synchronously enter the power saving mode by the core processing unit, wherein the step of recovering the processing module to work in the normal working mode according to the wake-up signal comprises:

recovering the core processing unit to work in the normal working mode according to the wake-up signal; and controlling the display control unit to synchronously recover to the normal working mode by the core processing unit.

17. The method for switching working mode as claimed in claim 16, further comprising:

controlling a light signal unit of the wireless display device to display a first light signal by the display control unit when the display control unit enters the power saving mode; and controlling the light signal unit to display a second light signal by the display control unit when the display control unit recovers to work in the normal working mode.

18. The method for switching working mode as claimed in claim 16, further comprising:

determining whether a connection request is received from the source device during another waiting time;

establishing a new connection between the wireless module and the source device when the connection request is received during the other waiting time, and determining whether an address resolution protocol request is received from the source device; and sending the media access control address of the wireless module to the source device by the wireless module according to an address resolution protocol when the address resolution protocol request is received from the source device.

19. The method for switching working mode as claimed in claim 15, wherein the specified packet is composed of a broadcast segment and a plurality of specified segments, and each of the specified segments is the media access control address of the wireless module.

\* \* \* \* \*